(12) United States Patent
Chari et al.

(10) Patent No.: US 10,503,911 B2
(45) Date of Patent: *Dec. 10, 2019

(54) AUTOMATIC GENERATION OF DATA-CENTRIC ATTACK GRAPHS

(71) Applicant: International Business Machines Coproration, Armonk, NY (US)

(72) Inventors: Suresh N. Chari, Tarrytown, NY (US); Ashish Kundu, Elmsford, NY (US); Ian M. Molloy, Chappaqua, NY (US); Dimitrios Pendarakis, Westport, CT (US); Josyula R. Rao, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,394

(22) Filed: Jul. 20, 2018

(65) Prior Publication Data

US 2018/0330103 A1 Nov. 15, 2018

Related U.S. Application Data

(63) Continuation of application No. 15/087,310, filed on Mar. 31, 2016, now Pat. No. 10,108,803.

(51) Int. Cl.
*G06F 21/57* (2013.01)
*H04L 12/24* (2006.01)
*H04L 29/06* (2006.01)

(52) U.S. Cl.
CPC ............ *G06F 21/577* (2013.01); *H04L 41/12* (2013.01); *H04L 63/1433* (2013.01); *G06F 2221/034* (2013.01)

(58) Field of Classification Search
CPC .................. H04L 63/1433; G06F 21/577
(Continued)

(56) References Cited

U.S. PATENT DOCUMENTS 8,272,061 B1  9/2012  Lotem et al.
8,407,798 B1  3/2013  Lotem et al.
(Continued)

OTHER PUBLICATIONS

Sheyner et al., "Tools for Generating and Analyzing Attack Graphs," Lecture Notes in Computer Science vol. 3188, Second International Symposium on Formal Methods for Components and Objects, Nov. 2003, pp. 344-371.
(Continued)

*Primary Examiner* — Trang T Doan
*Assistant Examiner* — Viral S Lakhia
(74) *Attorney, Agent, or Firm* — Yee & Associates, P.C.

(57) ABSTRACT

Generating an attack graph to protect sensitive data objects from attack is provided. The attack graph that includes nodes representing components in a set of components of a regulated service and edges between nodes representing relationships between related components in the set of components is generated based on vulnerability and risk metrics corresponding to each component. A risk score is calculated for each component represented by a node in the attack graph based on sensitivity rank and criticality rank corresponding to each respective component. Risk scores are aggregated for each component along each edge path connecting a node of a particular component to a node of a related component. In response to determining that an aggregated risk score of a component is greater than or equal to a risk threshold, an action is performed to mitigate a risk to sensitive data corresponding to the component posed by an attack.

20 Claims, 11 Drawing Sheets

(58) Field of Classification Search
USPC .......................................................... 713/150
See application file for complete search history.

(56) References Cited

U.S. PATENT DOCUMENTS

| | | | |
|---|---|---|---|
| 8,813,234 | B1 | 8/2014 | Bowers et al. |
| 8,931,043 | B2* | 1/2015 | Cooper ................... H04L 63/10 726/1 |
| 9,148,441 | B1* | 9/2015 | Tamersoy ........... H04L 63/1416 |
| 9,210,185 | B1* | 12/2015 | Pinney Wood ..... G06F 16/9024 |
| 9,256,739 | B1* | 2/2016 | Roundy ................ G06F 21/554 |
| 9,317,692 | B2 | 4/2016 | Elder et al. |
| 9,749,347 | B2 | 8/2017 | Wood et al. |
| 9,912,683 | B2* | 3/2018 | Cam ................... H04L 63/1433 |
| 9,967,274 | B2* | 5/2018 | Corrales ............. H04L 63/1425 |
| 2005/0203773 | A1* | 9/2005 | Soto ........................ G06Q 40/08 705/2 |
| 2009/0016238 | A1 | 1/2009 | Yu |
| 2011/0239303 | A1 | 9/2011 | Owens |
| 2013/0268994 | A1* | 10/2013 | Cooper ................... H04L 63/10 726/1 |
| 2014/0173740 | A1 | 6/2014 | Albanese et al. |
| 2014/0189873 | A1* | 7/2014 | Elder ................. H04L 63/1433 726/25 |
| 2015/0058993 | A1 | 2/2015 | Choi et al. |
| 2015/0381649 | A1 | 12/2015 | Schultz et al. |
| 2016/0036838 | A1 | 2/2016 | Jain et al. |
| 2016/0112284 | A1 | 4/2016 | Pon et al. |
| 2016/0248794 | A1 | 8/2016 | Cam |
| 2016/0301709 | A1* | 10/2016 | Hassanzadeh ...... H04L 63/1433 |
| 2017/0286690 | A1 | 10/2017 | Chari et al. |
| 2018/0197128 | A1* | 7/2018 | Carstens ............ G06Q 10/0635 |

OTHER PUBLICATIONS

Singhal et al., "Security Risk Analysis of Enterprise Networks Using Probabilistic Attack Graphs," NIST Interagency Report 7788, Aug. 2011, 24 pages.

Mell et al., "The NIST Definition of Cloud Computing," National Institute of Standards and Technology Special Publication 800-145, Sep. 2011, 7 pages.

Jha et al., "Two Formal Analyses of Attack Graphs," Proceedings of the 15th IEEE Computer Security Foundations Workshop, Jun. 2002, pp. 49-63.

Sheyner, "Scenario Graphs and Attack Graphs," Thesis, School of Computer Science, Computer Science Department, Carnegie Mellon University, Apr. 2004, 141 pages.

Dobzinski et al., "Scenario Graphs and Attack Graphs Project Webpage," Department of Computer Science, Carnegie Mellon University, undated website, 2 pages. Accessed Mar. 31, 2016, http://www.cs.cmu.edu/~odobzins/scenariograph/.

List of IBM Patents and Applications Treated as Related, dated Jul. 20, 2018, 2 pages.

Office Action, dated Jan. 30, 2018, regarding U.S. Appl. No. 15/087,310, 24 pages.

Notice of Allowance, dated Jun. 14, 2018, regarding U.S. Appl. No. 15/087,310, 9 pages.

Noel et al., "Measuring Security Risk of Networks using Attack Graphs", Jul. 2010, International Journal of Next-Generation Computing, 2010, vol. 1, No. 1, pp. 135-147.

* cited by examiner

AUTOMATIC GENERATION OF DATA-CENTRIC ATTACK GRAPHS

BACKGROUND

1. Field

The disclosure relates generally to attack graphs and more specifically to calculating a risk to a set of sensitive data objects, which correspond to a regulated service provided by a set of components comprising the regulated service, based on automatically generating a data-centric attack graph of nodes representing the set of components and propagating risk scores to related components along edge paths in the attack graph connecting related components.

2. Description of the Related Art

Today, many software applications access and/or process sensitive data, such as, for example, personal medical information or personal financial information, corresponding to individuals. However, many federal, state, and local laws regulate the accessing and processing of certain types of sensitive data corresponding to individuals. For example, federal regulations, such as the Health Insurance Portability and Accountability Act (HIPAA) and the Gram-Leach-Bliley Act, include specific mandates regarding the use of sensitive data. For example, HIPAA provides data privacy and security provisions for safeguarding sensitive personal medical information of individuals. The Gram-Leach-Bliley Act controls the way financial institutions may use sensitive personal financial information of individuals. As a result, any entity, such as institutions, enterprises, businesses, companies, or agencies, which provides one or more services that access and/or process these types of sensitive data must be able to determine whether the sensitive data is at risk of attack or compromise and take corrective action to eliminate, reduce, or mitigate the risk.

SUMMARY

According to one illustrative embodiment, a computer-implemented method for generating an attack graph to protect sensitive data objects located on a network from attack is provided. A computer generates the attack graph that includes nodes representing components in a set of components of a regulated service and edges between nodes representing relationships between related components in the set of components based on vulnerability and risk metrics corresponding to each component in the set of components. The computer calculates a risk score for each component represented by a node in the attack graph based on a sensitivity rank and a criticality rank corresponding to each respective component. The computer aggregates risk scores for each component along each edge path connecting a node of a particular component to a node of a related component to form an aggregated risk score for each component. In response to the computer determining that the aggregated risk score of a component is greater than or equal to a risk threshold, the computer performs an action to mitigate a risk to sensitive data corresponding to the component posed by an attack via the network. According to other illustrative embodiments, a computer system and computer program product for generating an attack graph to protect sensitive data objects located on a network from attack are provided.

DETAILED DESCRIPTION

Figure 1:
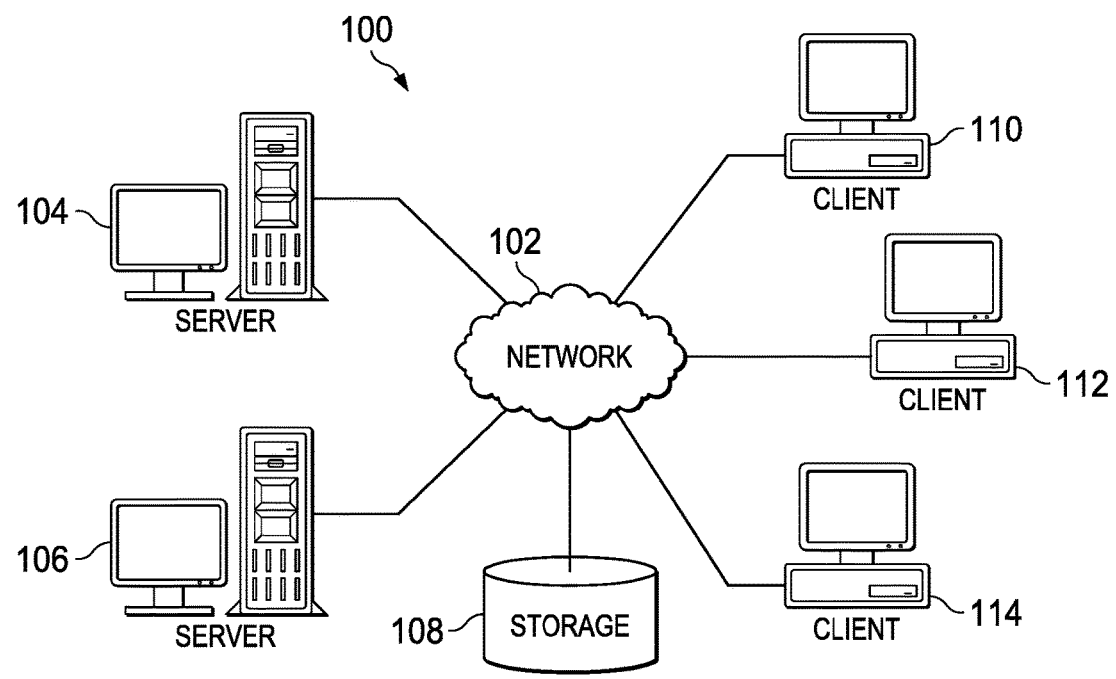
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers. In addition, server 104 and server 106 may provide a set of one or more regulated services, such as, for example, a service that processes sensitive data, such as, for example, sensitive personal medical information or sensitive personal financial institution information corresponding to individuals. A regulated service is a service that is regulated by federal, state, or local regulations or laws. The federal, state, or local regulations may, for example, limit a type and amount of sensitive data that may be stored, accessed, processed, transmitted, or disclosed by the service; when this sensitive data may be accessed; and who may access this sensitive data.

Further, server 104 or server 106 may automatically generate a data-centric attack graph comprising nodes that represent a set of components corresponding to a regulated service and propagate risk to related components along edge paths in the attack graph connecting related components to determine whether sensitive data is at risk of attack or compromise. Furthermore, server 104 and server 106 may automatically perform a set of one or more action steps to eliminate, reduce, or mitigate the risk to the sensitive data.

Client 110, client 112, and client 114 also connect to network 102. Clients 110, 112, and 114 are clients of server 104 and server 106. Server 104 and server 106 also may provide information, such as boot files, operating system images, and software applications to client devices 110, 112, and 114.

Clients 110, 112, and 114 may be, for example, computers, such as desktop computers or network computers with wire or wireless communication links to network 102. However, it should be noted that clients 110, 112, and 114 are intended as examples only. In other words, clients 110, 112, and 114 also may include other devices, such as, for example, laptop computers, handheld computers, smart phones, smart watches, personal digital assistants, or any combination thereof. Users of clients 110, 112, and 114 may use clients 110, 112, and 114 to access the set of regulated services provided by server 104 and server 106.

Storage 108 is a network storage device capable of storing any type of data in a structured format or an unstructured format. In addition, storage 108 may represent a set of one or more network storage devices. Storage 108 may store, for example, software applications that perform workloads corresponding to regulated services, topology graphs of the regulated services, regulatory compliance requirements, vulnerability and risk metrics corresponding to distributed components of the regulated services, attack graphs, risk scores, risk threshold values, action steps, and the like. Further, storage unit 108 may store other data, such as authentication or credential data that may include user names, passwords, and biometric data associated with risk analysts and system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

Figure 2:
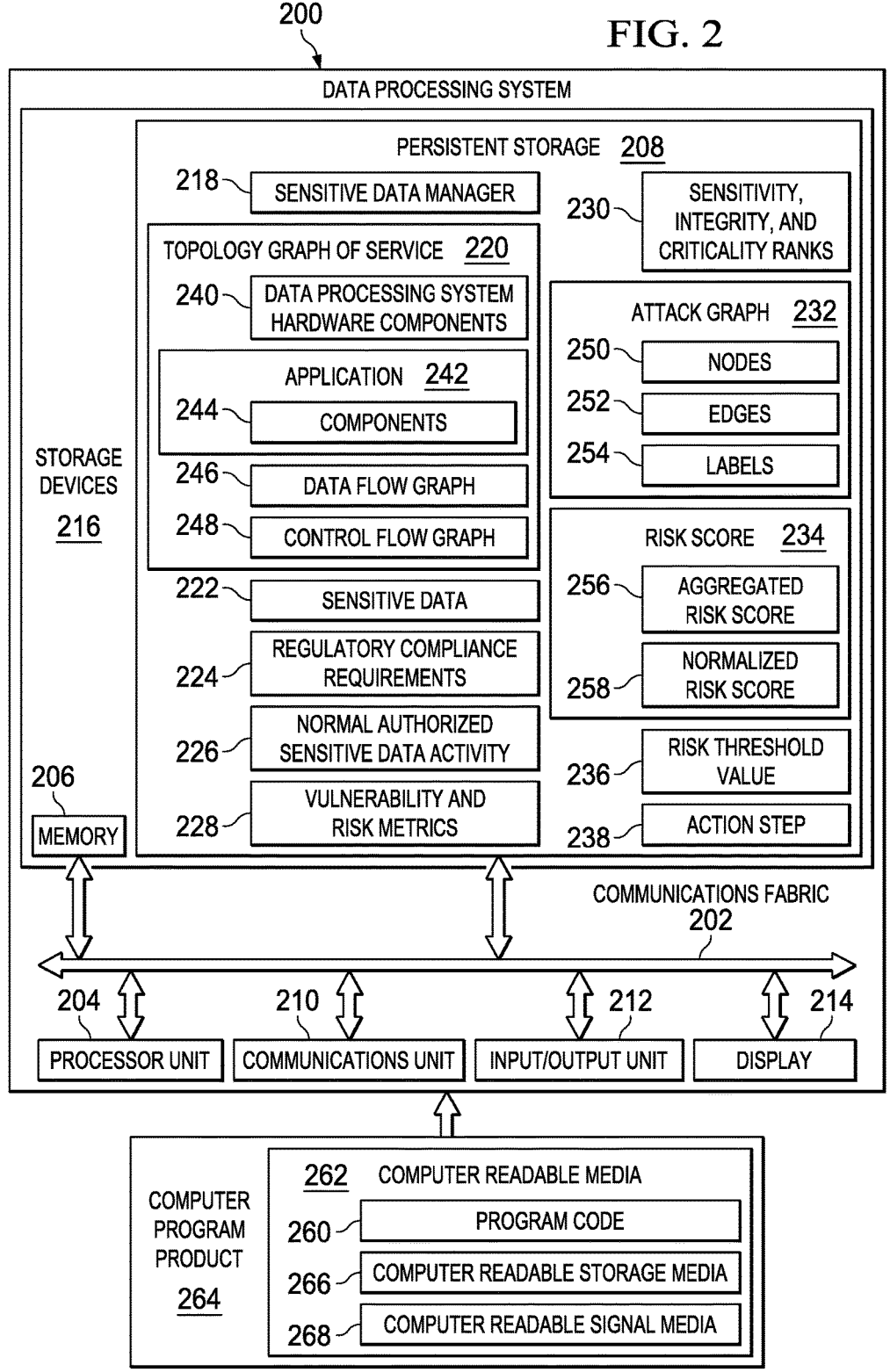
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores sensitive data manager 218. Sensitive data manager 218 calculates risk to a set of sensitive data corresponding to a regulated service based on generating a data-centric attack graph representing components of the regulated service and propagating risk to related components along edge paths in the attack graph connecting related components. It should be noted that even though sensitive data manager 218 is illustrated as residing in persistent storage 208, in an alternative illustrative embodiment sensitive data manager 218 may be a separate component of data processing system 200. For example, sensitive data manager 218 may be a hardware component coupled to communication fabric 202 or a combination of hardware and software components.

Also in this example, persistent storage 208 stores topology graph of service 220, sensitive data 222, regulatory compliance requirements 224, normal authorized sensitive data activity 226, vulnerability and risk metrics 228, sensitivity, integrity, and criticality ranks 230, attack graph 232, risk score 234, risk threshold value 236, and action step 238. However, it should be noted that alternative illustrative embodiments may include more or less data than illustrated.

Sensitive data manager 218 generates topology graph of service 220. Topology graph of service 220 is a topological representation of the components that comprise the regulated service and how the components are connected and related to one and other. The components of the regulated service may include data processing system hardware components 240 and application 242. Data processing system hardware components 240 may include, for example, a set of data processing systems, such as a set of one or more server computers, hosting the regulated service, storage devices, such as storage 108 in FIG. 1, and networks devices, such as routers and switches, which direct data over a network, such as network 102 in FIG. 1.

Application 242 may represent a set of one or more software applications that performs workloads corresponding to the regulated service. For example, application 242 may collect, process, and manage personal medical information, which is regulated by HIPAA, for an insurance company that processes medical claims. Sensitive data manager 218 may identify components 244 of application 242. Components 244 represent a plurality of different software components that comprise a software package corresponding to application 242. It should be noted that in an alternative embodiment, one or more components of components 244 may be distributed remotely in one or more server computers connected to the network.

Further, sensitive data manager 218 also may identify which components in data processing system hardware components 240 and components 244 of application 242 perform one or more activities associated with sensitive data in sensitive data 222 corresponding to the regulated service. In addition, sensitive data manager 218 may generate data flow graph 246 for application 242. Data flow graph 246 identifies the flow of sensitive data through application 242. Further, sensitive data manager 218 may generate control flow graph 248 for application 242. Control flow graph 248 identifies the different paths that sensitive data 222 may traverse through application 242 during execution of application 242.

Sensitive data 222 represent personal information of individuals that components of the regulated service perform one or more activities on, such as, for example, store, process, or transmit the sensitive data. Sensitive data manager 218 may utilize regulatory compliance requirements 224 to identify the requirements associated with performing activities on sensitive data 222 corresponding to the regulated service. Normal authorized sensitive data activity 226 represents those activities performed by components of the regulated service that are authorized activities under normal circumstances.

Vulnerability and risk metrics 228 represent measurements of vulnerability and risk to sensitive data 222. Sensitive data manager 218 may utilize vulnerability and risk metrics 228 to calculate risk score 234 for each component of the regulated service. In addition, sensitive data manager 218 may calculate sensitivity, integrity, and criticality ranks 230 for each component of the regulated service based on one or more business metrics. Sensitive data manager 218 may utilize sensitivity, integrity, and criticality ranks 230, in addition to vulnerability and risk metrics 228, to calculate risk score 234 for each component of the regulated service. Sensitivity rank of a component indicates how sensitive that particular component is to an attack. Integrity rank of a component indicates how resistant that particular component is to alteration or modification without proper authorization. Criticality rank of a component indicates how critical that particular component is to an operation of the regulated service.

Sensitive data manager 218 generates attack graph 232 based on topology graph of service 220, sensitive data 222, regulatory compliance requirements 224, normal authorized sensitive data activity 226, vulnerability and risk metrics 228, and sensitivity, integrity, and criticality ranks 230. Attack graph 232 includes nodes 250, edges 252, and labels 254. Nodes 250 represent components of the regulated service. Edges 252 represent paths between related components. Sensitive data manager 218 may attach labels 254 to nodes 250 and/or edges 252. Labels 254 represent relevant information associated with an attached node or edge. Sensitive data manager 218 may utilize attack graph 232 to determine how an attacker may access some or all of sensitive data 222 through one or more components of the regulated service. It should be noted that attack graph 232 changes over time.

Further, sensitive data manager 218 may generate risk score 234 for each component of the regulated service. Risk score 234 indicates a level of risk a particular component poses to sensitive data 222. Furthermore, sensitive data manager 218 may generate aggregated risk score 256 for each component of the regulated service by propagating risk scores associated with components to related components connected by edges 252. Moreover, sensitive data manager 218 may generate normalized risk score 258 for each component based on aggregated risk score 256. Normalized risk score 258 may be, for example, a value between zero and one.

Sensitive data manager 218 may compare normalized risk score 258 to risk threshold value 236. In response to sensitive data manager 218 determining that normalized risk score 258 is greater than or equal to risk threshold value 236, sensitive data manager 218 may perform action step 238. Action step 238 is a set of one or more steps that sensitive data manager 218 may perform to mitigate or eliminate a threat posed to sensitive data 222 by an attacker.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 260 is located in a functional form on computer readable media 262 that is selectively removable and may be loaded onto or transferred to data processing system 200 for running by processor unit 204. Program code 260 and computer readable media 262 form computer program product 264. In one example, computer readable media 262 may be computer readable storage media 266 or computer readable signal media 268. Computer readable storage media 266 may include, for example, an optical or magnetic disc that is inserted or placed into a drive or other device that is part of persistent storage 208 for transfer onto a storage device, such as a hard drive, that is part of persistent storage 208. Computer readable storage media 266 also may take the form of a persistent storage, such as a hard drive, a thumb drive, or a flash memory that is connected to data processing system 200. In some instances, computer readable storage media 266 may not be removable from data processing system 200.

Alternatively, program code 260 may be transferred to data processing system 200 using computer readable signal media 268. Computer readable signal media 268 may be, for example, a propagated data signal containing program code 260. For example, computer readable signal media 268 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 260 may be downloaded over a network to persistent storage 208 from another device or data processing system through computer readable signal media 268 for use within data processing system 200. For instance, program code stored in a computer readable storage media in a data processing system may be downloaded over a network from the data processing system to data processing system 200. The data processing system providing program code 260 may be a server computer, a client computer, or some other device capable of storing and transmitting program code 260.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 266 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
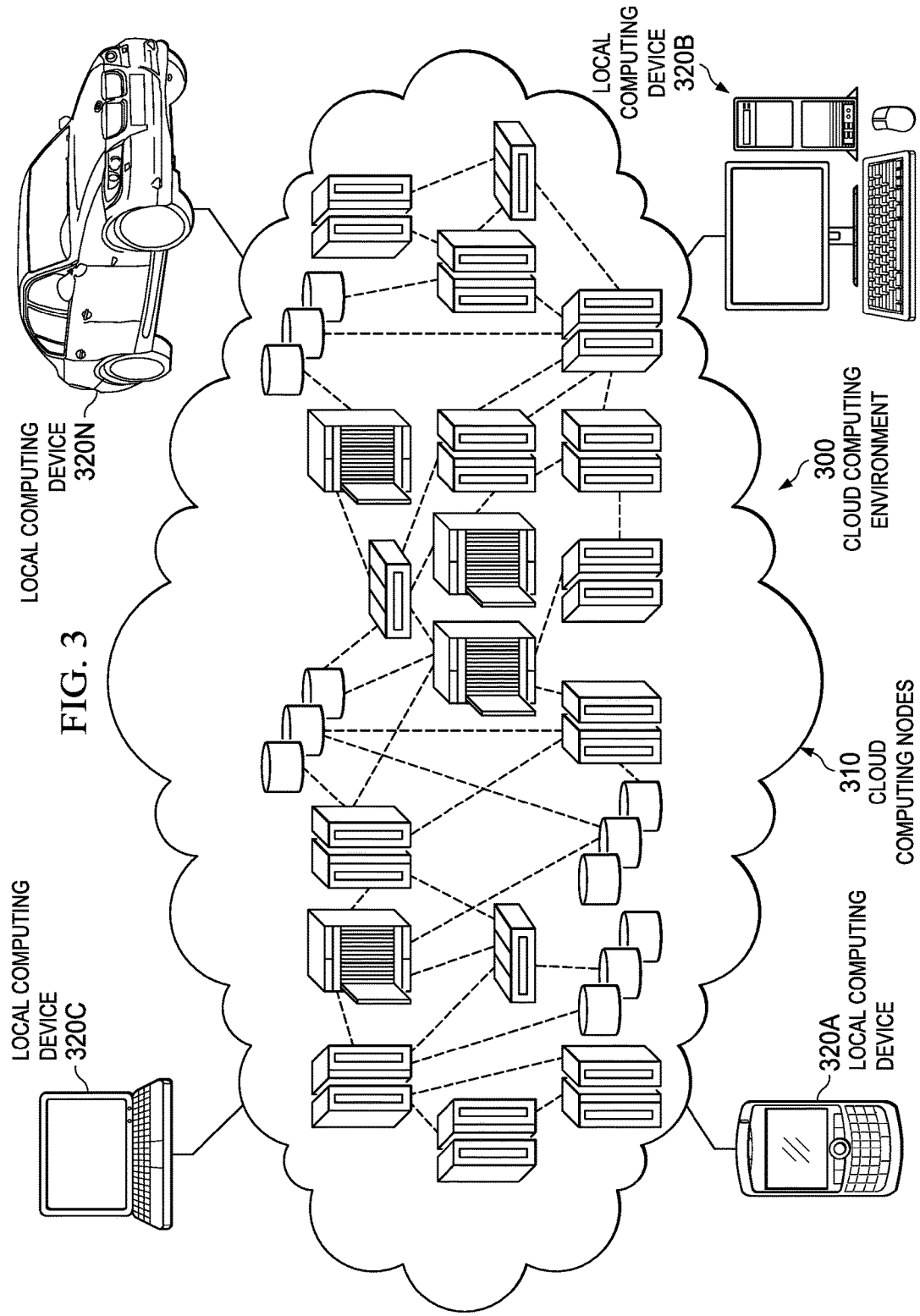
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of computing devices 320A-320N are intended to be illustrative only and that cloud computing nodes 310 and cloud computing environment 300 can communicate with any type of computerized device over any type of network and/or network addressable connection using a web browser, for example.

Figure 4:
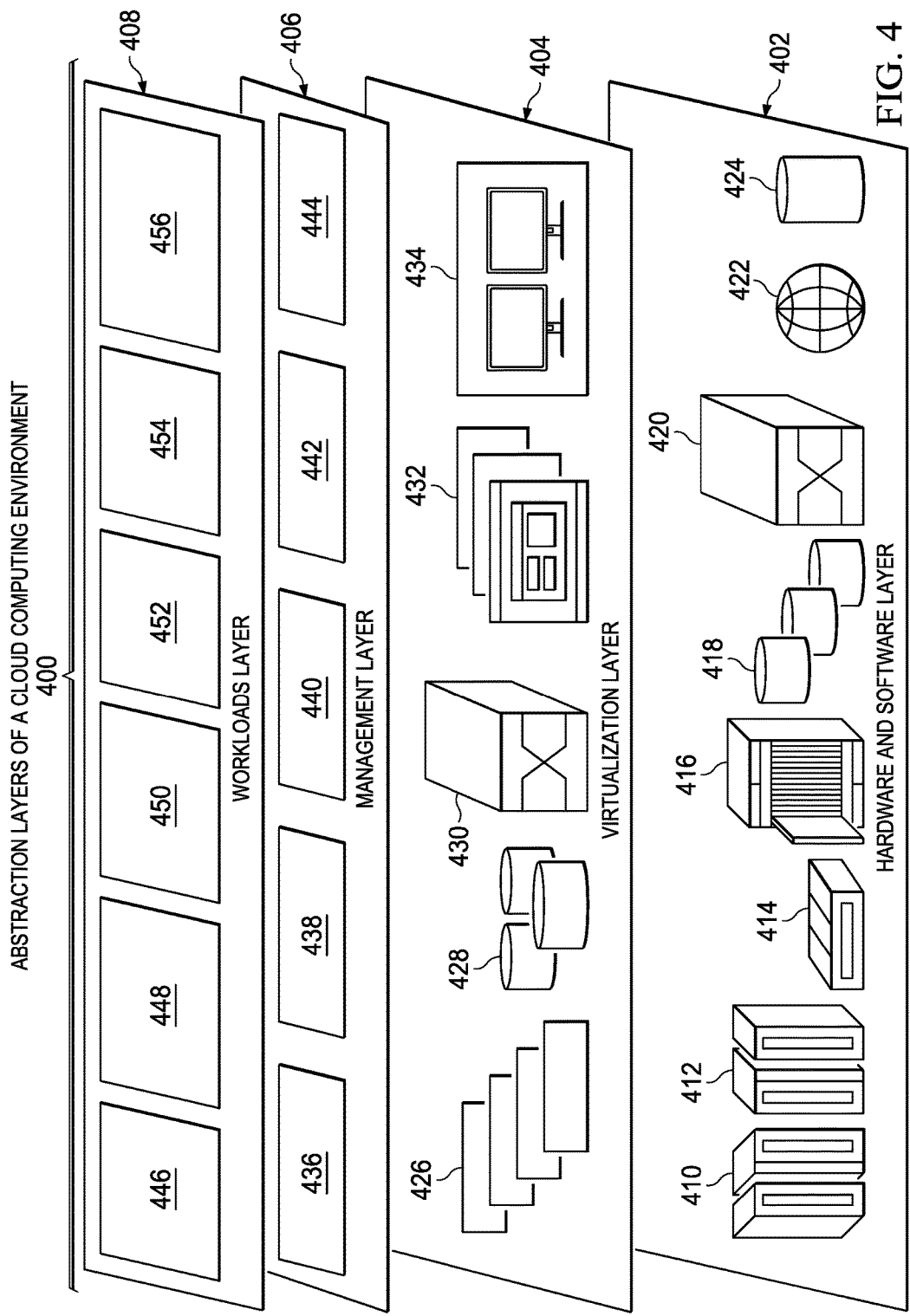
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and calculating risk to sensitive data corresponding to a regulated service provided by a set of components based attack graphs 456.

In the course of developing illustrative embodiments, it was discovered that computation of risk to a set of sensitive data objects being attacked based on edge paths in attack graphs is necessary for security and compliance monitoring and assurance. However, existing techniques for generating attack graphs are system-centric and not data-centric. Currently, risk computation is only based on reachability properties of nodes within the attack graphs. Reachability refers to the ability to get from one node to another node within an attack graph. For example, an attack graph can comprise nodes representing a group of servers connected to a network and illustrate how each server can reach other servers in the group and how an attacker can reach a server in the group or reach different components within one server.

Illustrative embodiments calculate risk to sensitive data objects by distributed components corresponding to a regulated service based on attack graphs and propagation of risk along edge paths within the attack graphs. Illustrative embodiments calculate risk of attack on the sensitive data objects based on attack paths, which have nodes representing sensitive data objects as sink nodes and nodes representing sensitive data attackers as source nodes in an attack graph. Illustrative embodiments calculate risk of attack on the sensitive data objects using path propagation. In other words, illustrative embodiments use edge paths in the attack graphs to propagate a level of risk from a sink node to a source node and/or from a source node to a sink node, for example.

Illustrative embodiments generate attack graphs, which include hardware and software components of a regulated service that perform activities on sensitive data, based on aggregation of information instead of reachability properties. Aggregation of information regarding distributed components of the regulated service may include, for example, common vulnerabilities and exposures (CVE) identifiers; Common Vulnerability Scoring System (CVSS) scores, Confidentiality, Integrity, and Availability (CIA) ratings, data flow and control flow of each component; and the like. CVE identifiers provide identification of known data security vulnerabilities and exposures in software packages. CVSS scores provide a standard for assessing severity of computer system security vulnerabilities. CVSS scores range from zero to ten, with ten being the most severe. CIA ratings provide an evaluation of a data processing system's security focusing on the confidentiality, integrity, and availability of data in the data processing system. Data flow represents flow of data through a component of the regulated service. Control flow represents an order in which program instructions are executed or evaluated.

Illustrative embodiments may generate the attack graphs as, for example, AND/OR graphs with order between edges. Nodes of an AND/OR graph may represent states or goals and edges to successor nodes may be labeled as either AND or OR edges. AND edges may represent sub-states or sub-goals that must all be achieved to satisfy the parent node state or goal. Illustrative embodiments may illustrate AND edges in an AND/OR graph as an arc, for example. OR edges may represent alternative sub-states or sub-goals, any one of which may satisfy the parent node state or goal. Illustrative embodiments may illustrate OR edges in an AND/OR graph as a straight line, for example.

Calculation of risk involves computing CIA ratings. Illustrative embodiments generate the attack graphs based on known vulnerabilities at the application, middleware, operating system, virtual machine image, and other component layers of the regulated service. Illustrative embodiments may apply a network flow on the attack graph, where the capacity of a component of the regulated service is proportional to a level of risk corresponding to an edge/node representing that component. Illustrative embodiments may calculate a capacity value using a max-flow min-cut algorithm. The max-flow min-cut algorithm determines a maximum amount of flow passing from a source node to a sink node in the attack graph is equal to a minimum capacity that, when removed from a network, causes no flow to pass from the source node to the sink node.

Illustrative embodiments calculate the risk using the generated attack graphs. Illustrative embodiments identify a set of sensitive data objects, such as, for example, personal healthcare records, which need to be protected as part of regulatory compliance requirements, and identify other sensitive data objects, such as cryptographic keys and passwords, which are used to protect the set of sensitive data objects and the data processing system hosting the regulated service. Illustrative embodiments also identify components of the data processing system hosting the regulated service, such as, for example, data storage devices; middleware components, such as databases, Web servers, operating systems, and cloud virtual machines; software code of an application that provides the regulated service; network communication devices, such as routers and load balancers; and other entities of the service that are authorized to access sensitive data objects and/or computing. Types of sensitive data access may include, for example, store, transmit, process, or get temporary storage. In addition, illustrative embodiments identify the time and other meta-data associated with such authorized access. Further, illustrative embodiments identify user identifications that carry out the access to the sensitive data.

Furthermore, illustrative embodiments may identify a set of "normal authorized events," which may perform activities, such as accesses and operations on the sensitive data objects, using other meta-data such as: what (e.g., identifiers of the sensitive data objects accessed or processed); where (e.g., internet protocol addresses or component names); who (e.g., user identifiers); when (e.g., start and stop time stamps); how (e.g., operation used to gain access); and the like. Moreover, illustrative embodiments may generate a topology graph of the regulated service, which may include a data flow graph and a control flow graph for an application that provides the regulated service. Each edge between two nodes in the topology graph refers to "data flow" or "control flow" in the application that provides the regulated service. Each node in the topology graph refers to a component, such as a data processing system, an operating system, or such other entity, which is part of the regulated service. Examples of data flows are: 1) sensitive data object flows from an object store to a virtual machine; and 2) encrypted credentials flows from a virtual machine to a database and vice versa. An example of a control flow is scheduling tasks by one virtual machine on another virtual machine via representational state transfer application programming interface invocation. Illustrative embodiments also may identify configuration details of components from a configuration management database (CMDB). Configuration details may include, for example, network firewall policies, which nodes can access other nodes over the network, when a user having a particular role can access the data processing system, what the frequency is of data backups, and the like.

For each component, illustrative embodiments may collect vulnerability and risk metrics from, for example: 1) CVE identifiers, CVSS scores, Common Weakness Enumeration (CWE) that provides a measurable set of source code and operational system weaknesses, National Vulnerability Database (NVD) that enables automation of vulnerability management, security measurement, and compliance, and blog information; 2) vulnerability information obtained from penetration testing, application source code scanning, and network scanning; and 3) other sources, such as inputs from application developers, system administrators, and security/risk analysts. In addition, illustrative embodiments may calculate a sensitivity rank, an integrity rank, and a criticality rank for each component of the regulated service based on the topological graph. Sensitivity rank of a component indicates how sensitive that particular component is to an attack. Integrity rank of a component indicates how resistant that particular component is to alteration or modification without proper authorization. Criticality rank of a component indicates how critical that particular component is to an operation of the regulated service. Illustrative embodiments may calculate the sensitivity, integrity, and criticality ranks for each component by applying, for example, page-rank or a customized version of page-rank, on the topology graph.

Illustrative embodiments generate a data-centric attack graph and assign locally aggregated risk scores to each node (i.e., each component) in the attack graph based on the vulnerability and risk metrics and the sensitivity, integrity, and criticality ranks identified above for each component of the regulated service. Illustrative embodiments propagate risk scores along each edge path going from a sink node to a source node or going from a source node to a sink node, as the aggregated component data being the center of the risk propagation. Illustrative embodiments may calculate a total risk corresponding to the regulated service or each component by combining, for example, the propagated risk scores, locally aggregated risk scores, and the calculated sensitivity, integrity, and criticality ranks. Illustrative embodiments also may normalize the total risk score to a value between zero and one, for example. However, it should be noted that alternative illustrative embodiments may normalize the total risk score to a value between zero and one hundred, for example. In addition, illustrative embodiments may remove edges/nodes in the attack graph that have a zero risk level or a zero probability of risk.

Illustrative embodiments generate a node in the attack graph for each component of the regulated service that is associated with some type of sensitive data in some manner, carries out a sensitive data operation (e.g., is associated with a security or privacy function of the regulated service), and is a component that has a CVE identifier, a vulnerability, or a risk associated with it. If the network and regulated service configuration of components represented by node (X) and node (Y) in the attack graph such that:

1) if a sub-component X(i) of component X can communicate with sub-component Y(j) of component Y for at least a non-null window of time, then:
   a) illustrative embodiments generate a node X(i) with an ownership edge from node X(i) to node X and generate a node Y(j) with an ownership edge from node Y(j) to node Y; and
   b) illustrative embodiments generate an edge from node X(i) to node Y(j) and label the edge with the following attributes: "user name of X(i), user name of Y(j), privilege level at X and Y, time period of such communication, data flow or control flow, what type of sensitive data is sent, what type of method is invoked, and risk score of such vulnerability, if any;"

2) if a user (U) can communicate with sub-component Y(j) of component Y, then illustrative embodiments perform a similar process as above by generating a node for user U and an edge from node U to node Y(j)); and 3) if an external data processing system can communicate with sub-component Y(j) of component Y, then:
   a) if it is a person (P) on the internet, then illustrative embodiments generate a node P in the attack graph and generate an edge from node P to node Y(j); and
   b) if the person on a WAN (W), LAN (L), or VLAN (V), then illustrative embodiments generate a node W, node L, or node V and generate an edge from node W, L, or V to node Y(j).

Illustrative embodiments may generate the attack graph in a breadth-first manner for each node in the set of nodes and edges generated above that have not been marked "processed" or "done." Further, illustrative embodiments generate a node (A) in the attack graph representing each type of attacker that can exploit a vulnerability in the component represented by the node X (e.g., from CVE identifiers or from threat vectors) if such a node A does not already exist in the attack graph. An attacker may be, for example, an external user that does not have an identification for the system, a user that does have an identification for the system, a user who can send an access request for sensitive data, and the like. Furthermore, illustrative embodiments generate an edge in the attack graph from node A to node X. Moreover, illustrative embodiments may label the edge with vulnerability information. For example, illustrative embodiments may label an edge with a CVE identifier, a type of access or attack, such as remote, method used, such as remote shell, and the like. Illustrative embodiments also may associate two or more edges, such as, for example, edge1, edge2, and edge3, with a common destination, such as, for example, node X, as AND edge paths resulting in an edge (X, Z), if and only if, the vulnerability of node X can be exploited, if and only if, all the edge paths edge1, edge2, and edge3 can be exploited. Similarly, illustrative embodiments may assign OR edge paths if one or all of the edge paths edge1, edge2, and edge3 can be exploited. In other words, for OR edge paths, only one of the edge paths edge1, edge2, or edge3 has to be exploited.

Illustrative embodiments also may generate multi-step attack paths, where illustrative embodiments connect one vulnerability to another vulnerability. Such a path containing two or more edges, such as, for example, edge1, edge2, and edge3, represents a potential attack where an attacker needs to exploit the vulnerability of edge1, then the vulnerability of edge2, and then the vulnerability of edge3 to compromise the component represented by the destination node of edge3.

In addition, illustrative embodiments may generate a sensitivity rank, an integrity rank, and a criticality rank for each component corresponding to the regulated service. Illustrative embodiments identify priorities of business processes performed by the regulated service and priorities of servers performing the business processes. A low priority value may be, for example, zero and high priority value may be, for example, one. Illustrative embodiments may utilize a topology graph of components comprising the regulated service and calculate rank of sensitivity of each component of the regulated service. Illustrative embodiments may calculate the sensitivity rank of a particular component as a function over time using information in the topology graph, such as, for example: 1) sensitive data being stored and/or processed by that particular component (e.g., the degree of sensitivity of the data, size of the data, duration of the data on the system, how the level of sensitivity of the component varies over time, et cetera); 2) operations carried out by that particular component (e.g., the level of sensitivity of operations that particular component carries out, duration of the operations, how the level of sensitivity of the operations vary over time, et cetera); 3) data flowing from other components into that particular component over data flow edges of the topology graph (e.g., levels of sensitivity of the other components and associated parameters); and 4) operations triggered by the other components on that particular component (e.g., levels of sensitivity of the other components and associated parameters). Illustrative embodiments similarly calculate the integrity rank and the criticality rank of that particular component using same or similar information in the topology graph. Further, illustrative embodiments may utilize a recursive formulation to calculate each of the sensitivity, integrity, and criticality ranks for each component of the regulated service. For example, illustrative embodiments may utilize page-rank as the recursive formulation.

Illustrative embodiments also may propagate risk along the paths in the attack graph. Illustrative embodiments may propagate the risk to sensitive data along each edge path from a sink node representing sensitive data, which is an object of an attack, to a source node of the attack (i.e., the sensitive data being attacked is the center of the propagation). Then the risk propagated from the sink node to the source node is re-computed again from the source node to the sink node path in a breadth-first traversal of the attack graph. Once illustrative embodiments calculate the risks for each node and edge in the attack graph, then illustrative embodiments apply network flow algorithms to determine the paths with maximum risks (i.e., risks representing edge/node capacities in the context of network flow). It should be noted that risks are zero or positive so that no negative capacities exist.

The sink node is the node that represents one or more sensitive data objects in plaintext. The source node is the node that represents a potential attacker or source of threat. Illustrative embodiments may represent local risk of a node (X) as a vector (R(X)). For example, illustrative embodiments may represent the local risk of node X as vector [Sensitivity rank, Integrity rank, Criticality rank]. Sensitivity rank sr(X)=function 'sf' on CVSS scores and other risks related to sensitivity, along with the sensitivity rank of the node X. Integrity risk ir(X)=function 'if' on CVSS scores related to integrity and other risks, along with the integrity rank of the node X. Criticality risk cr(X)=function 'cf' on CVSS scores related to criticality and other risks, along with the criticality rank of the node X.

Illustrative embodiments may propagate risk backward from a sink node to a source node. For example, for each edge path (Y→X), illustrative embodiments may propagate risk from node X to node Y. The cumulative risk of X (r (X)) using a vector of functions (F), which includes [sf, if, cf], such that Y receives the propagated risk of F(R(X)). The vector of functions F takes into account the probability of risk corresponding to the edge path Y→X, the timing of the sensitive data access, and so on. For node X, illustrative embodiments calculate the cumulative risk r(X) using a vector of function (G) of the risk along all of node X's incoming edge paths and node X's local risk R(X). Illustrative embodiments repeat the steps of calculating local risk, propagating risk, and calculating cumulative risk for each node in the attack graph.

Further, illustrative embodiments may calculate the risk of the regulated service represented by the attack graph. According to one illustrative embodiment, the maximum risk of all sink nodes is the risk of the regulated service. According to another embodiment, the capacity of a path edge (X, Y) is the cumulative risk r(X) of node X. This other illustrative embodiment may apply a max-flow min-cut algorithm to determine the maximum capacity of the network, which is the risk of the regulated service.

Figure 5:
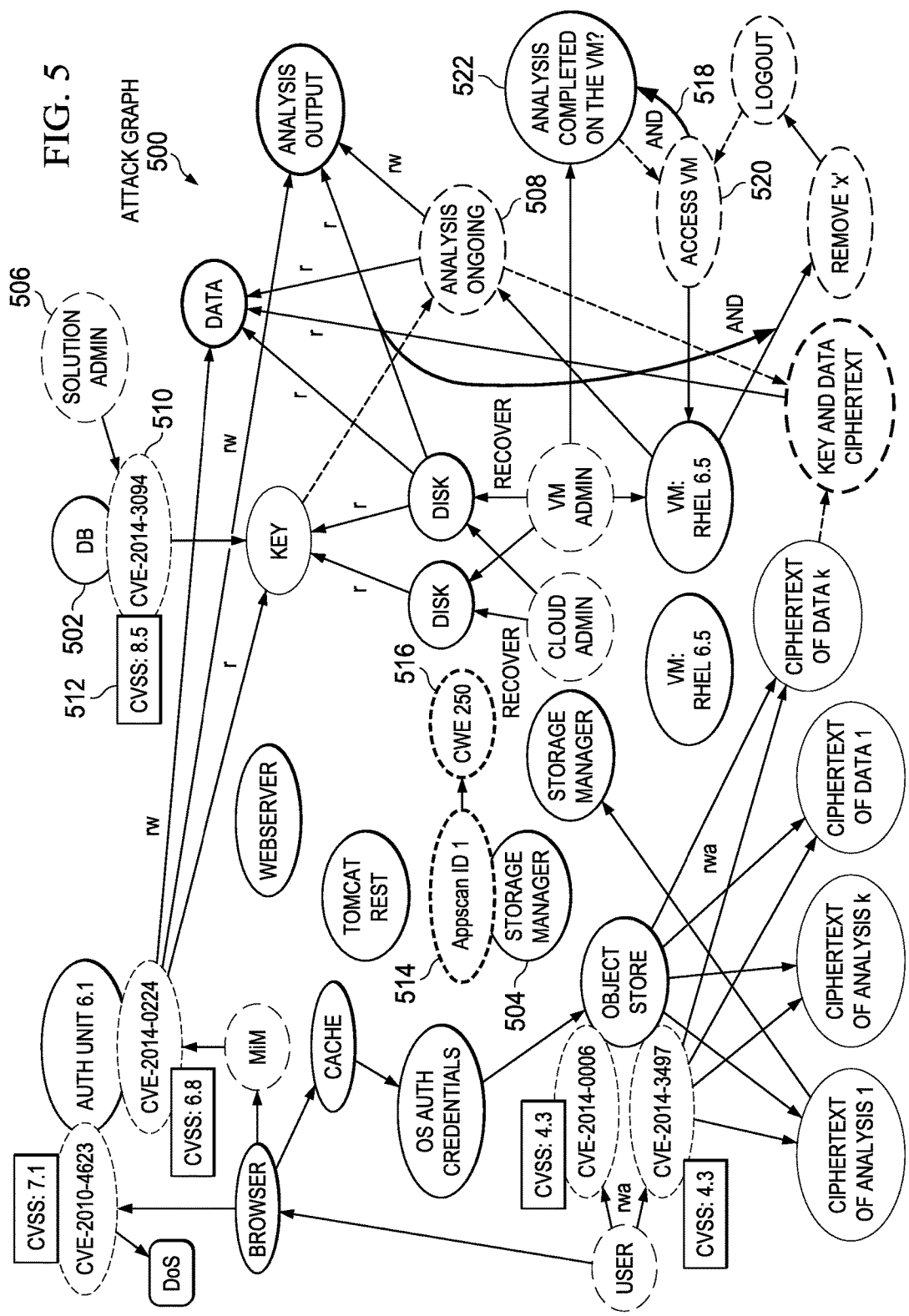
FIG. 5 is a diagram illustrating an example of an attack graph in accordance with an illustrative embodiment.

With reference now to FIG. 5, a diagram illustrating an example of an attack graph is depicted in accordance with an illustrative embodiment. It should be noted that attack graph 500 is a specific example of one type of attack graph. However, illustrative embodiments are not restricted to such. In other words, illustrative embodiments may utilize other types of attach graphs.

In this example, attack graph 500 is an AND/OR graph. Attack graph 500 may be, for example, attack graph 232 in FIG. 2. Attack graph 500 includes a plurality of nodes, such as nodes 250 in FIG. 2. Each node may represent a component of a regulated service, such as node 502 or node 504. In addition, attack graph 500 may include other nodes that are not components of the regulated service, such as, for example, a node that represents a user, such as node 506, or a node that represents a state, such as node 508. Attack graph 500 also includes a plurality of edges, such as edges 252 in FIG. 2, which connect related nodes. In addition, the edges may include labels, such as labels 254 in FIG. 2.

In this example, database node 502 includes CVE identifier 510 and CVSS score 512. Also in this example, application scan 514 was run on storage manager node 504 producing CWE 516. A sensitive data manager, such as sensitive data manager 218 in FIG. 2, may utilize the CVE, CVSS, and CWE information to determine sensitive data vulnerabilities and weakness that may exist in the components corresponding to nodes 502 and 504, respectively. The sensitive data manager may calculate the risk to a set of sensitive data objects associated with the regulated service based on determining the sensitive data vulnerabilities and weakness of components corresponding to nodes and propagating the risk to related components along edge paths in attack graph 500 that connect related components.

Attack graph 500 also includes AND edge 518 between node 520 and node 522. AND edge 518 indicates that an action corresponding to node 522 (i.e., completing analysis on the virtual machine) is to be carried out prior to carrying out an action corresponding to node 520 (i.e., accessing the virtual machine). Order of action in attack graph 500 is important because if a sequence is not followed, then a corresponding attack will not be successful.

Figure 6A:
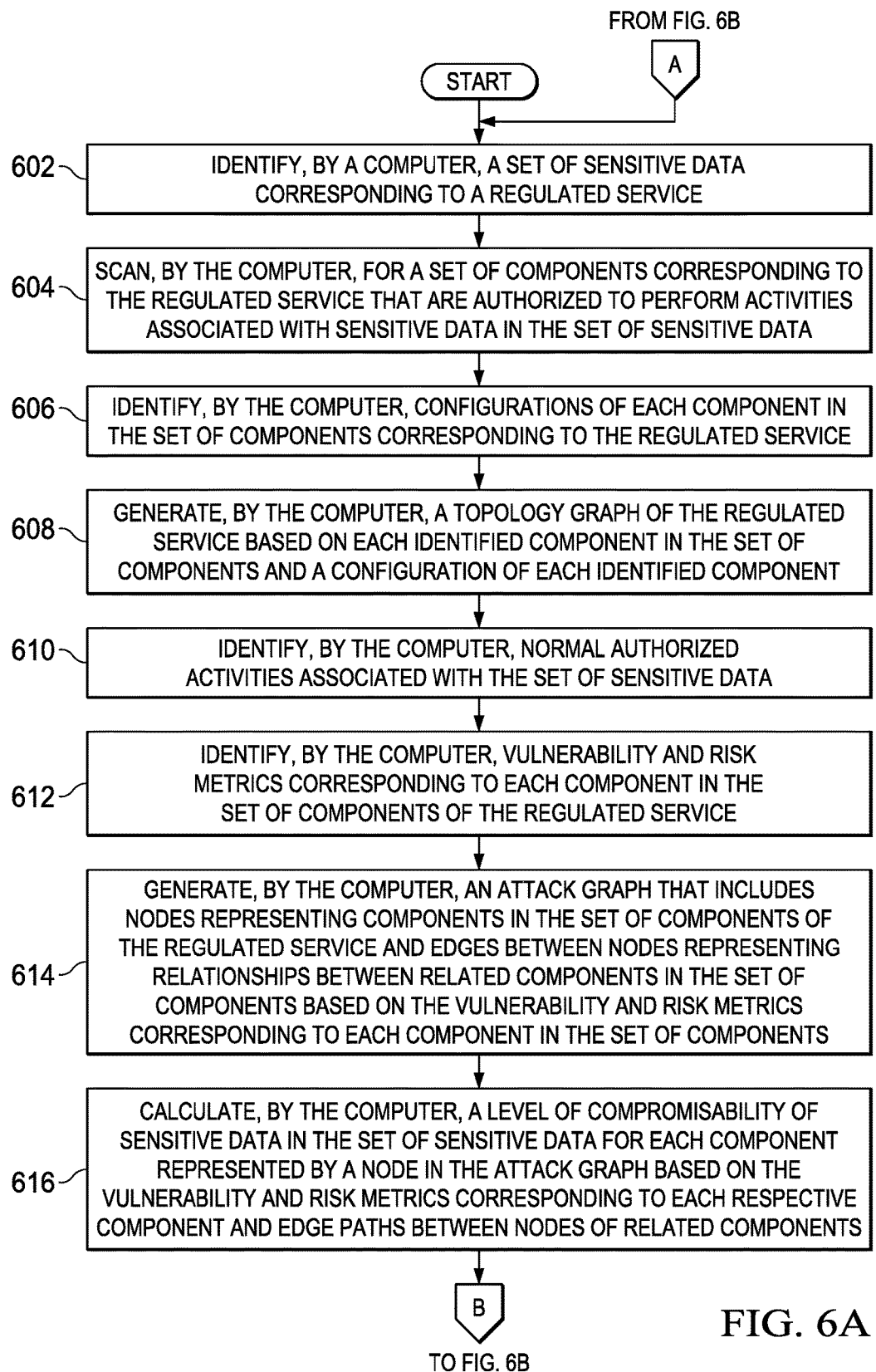
FIGS. 6A-6B are a flowchart illustrating a process for calculating risk to sensitive data using an attack graph in accordance with an illustrative embodiment.
Figure 6B:
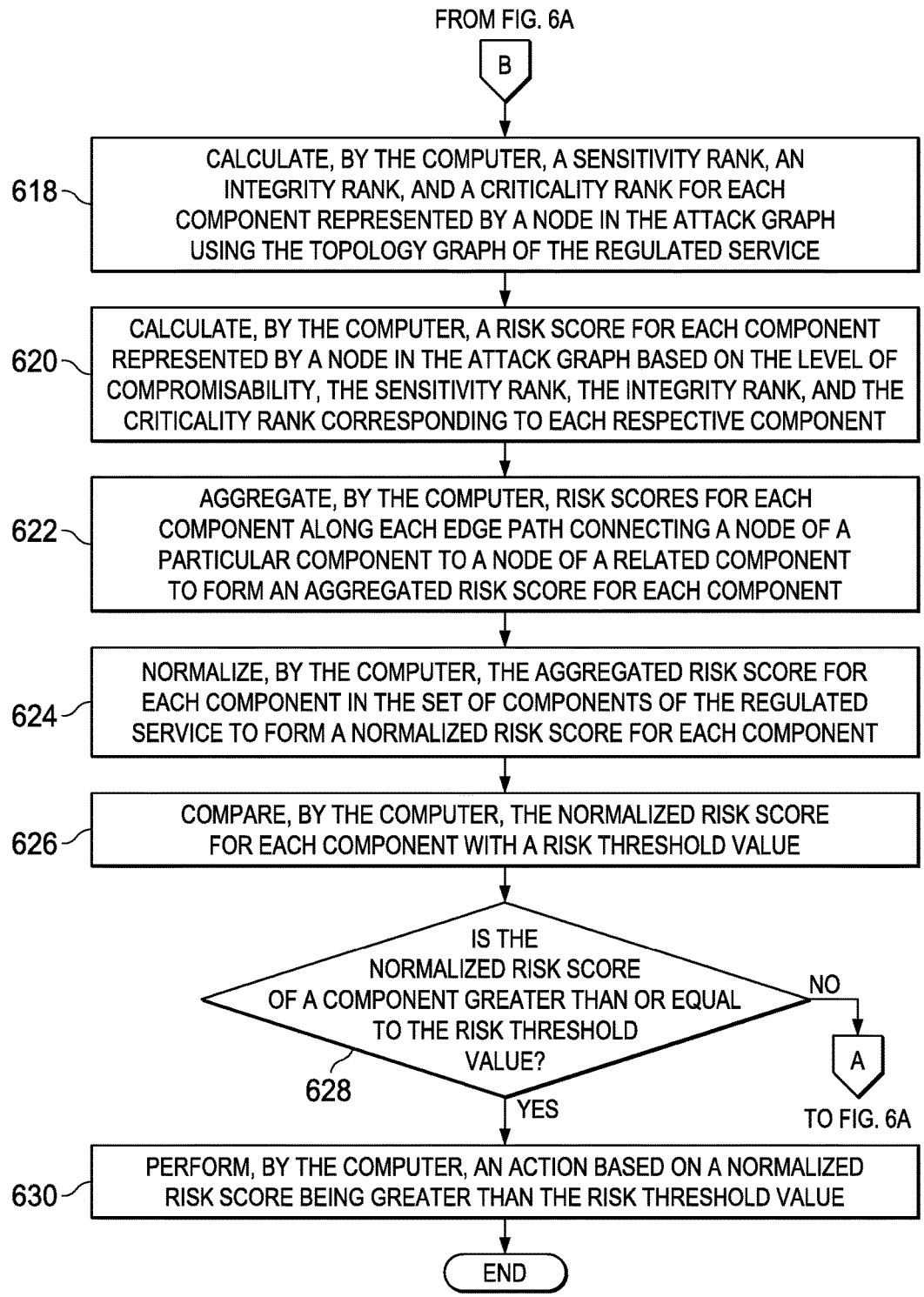

With reference now to FIGS. 6A-6B, a flowchart illustrating a process for calculating risk to sensitive data using an attack graph is shown in accordance with an illustrative embodiment. The process shown in FIGS. 6A-6B may be implemented in a computer, such as, for example, server 104 FIG. 1 and data processing system 200 in FIG. 2.

The process begins when the computer identifies a set of sensitive data corresponding to a regulated service (step 602). The set of sensitive data may be, for example, sensitive data 222 in FIG. 2. In addition, the computer scans for a set of components corresponding to the regulated service that are authorized to perform activities associated with sensitive data in the set of sensitive data (step 604). The set of components may be, for example, data processing system hardware components 240 and components 244 of application 242 in FIG. 2. Further, the computer identifies configurations of each component in the set of components corresponding to the regulated service (step 606). The computer scans for the set of components to identify the set of components and their respective configurations.

Afterward, the computer generates a topology graph of the regulated service based on each identified component in the set of components and a configuration of each identified component (step 608). The topology graph of the regulated service may be, for example, topology graph of service 220 in FIG. 2. The computer also identifies normal authorized activities associated with the set of sensitive data (step 610). In addition, the computer identifies vulnerability and risk metrics corresponding to each component in the set of components of the regulated service (step 612). The vulnerability and risk metrics may be, for example, vulnerability and risk metrics 228 in FIG. 2. The computer may identify the vulnerability and risk metrics of a component using, for example, Common Vulnerabilities and Exposures (CVE) identifiers, application scanning, penetration testing, vulnerability scanning, and the like. CVE identifiers provide identification of known data security vulnerabilities and exposures in software packages. Application scanning analyzes Web applications for security vulnerabilities. Penetration testing analyzes a computer system, network, or Web application to find vulnerabilities that an attacker could exploit. Vulnerability scanning analyzes clouds and networks for security weaknesses that may allow an attacker to access or control sensitive data located on the clouds or networks.

Subsequently, the computer generates an attack graph that includes nodes representing components in the set of components of the regulated service and edges between nodes representing relationships between related components in the set of components based on the vulnerability and risk metrics corresponding to each component in the set of components (step 614). The attack graph may be, for example, attack graph 232 in FIG. 2 or attack graph 500 in FIG. 5. Further, the computer calculates a level of compromisability of sensitive data in the set of sensitive data for each component represented by a node in the attack graph based on the vulnerability and risk metrics corresponding to each respective component and edge paths between nodes of related components (step 616). The computer may calculate the level of compromisability of the sensitive data using a max-flow min-cut algorithm. The max-flow min-cut algorithm determines a maximum amount of flow passing from a source node to a sink node in the attack graph is equal to a minimum capacity that, when removed from a network, causes no flow to pass from the source node to the sink node.

Furthermore, the computer calculates a sensitivity rank, an integrity rank, and a criticality rank for each component represented by a node in the attack graph using the topology graph of the regulated service (step 618). The sensitivity, integrity, and criticality ranks may be, for example, sensitivity, integrity, and criticality ranks 230 in FIG. 2. Moreover, the computer calculates a risk score for each component represented by a node in the attack graph based on the level of compromisability, the sensitivity rank, the integrity rank, and the criticality rank corresponding to each respective component (step 620). The risk score may be, for example, risk score 234 in FIG. 2.

Afterward, the computer aggregates risk scores for each component along each edge path connecting a node of a particular component to a node of a related component to form an aggregated risk score for each component (step 622). The aggregated risk score may be, for example, aggregated risk score 256 in FIG. 2. The computer also normalizes the aggregated risk score for each component in the set of components of the regulated service to form a normalized risk score for each component (step 624). The normalized risk score may be, for example, normalized risk score 258 in FIG. 2. The computer may normalize the aggregated risk score for each component to a value between zero and one, for example.

Subsequently, the computer compares the normalized risk score for each component with a risk threshold value (step 626). The risk threshold value may be, for example, risk threshold value 236 in FIG. 2. The computer makes a determination as to whether the normalized risk score of a component is greater than or equal to the risk threshold value (step 628). If the computer determines that the normalized risk score of a component is less than the risk threshold value, no output of step 628, then the process returns to step 602. If the computer determines that the normalized risk score of a component is greater than or equal to the risk threshold value, yes output of step 628, then the computer performs an action based on the normalized risk score being greater than the risk threshold value (step 630). The action may be, for example, action step 238 in FIG. 2. Thereafter, the process terminates.

Figure 7A:
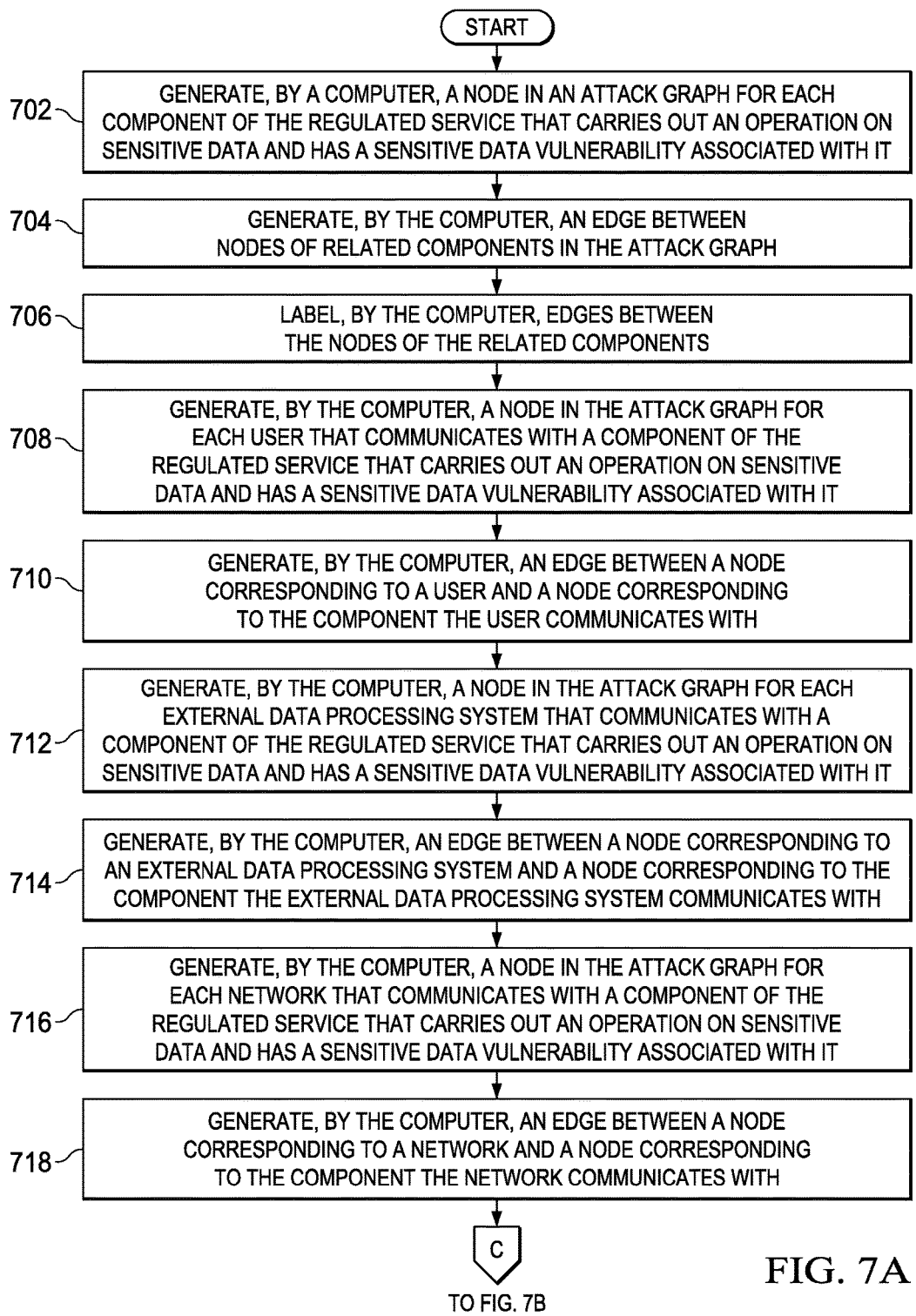
FIGS. 7A-7B are a flowchart illustrating a process for generating an attack graph in accordance with an alternative illustrative embodiment.
Figure 7B:
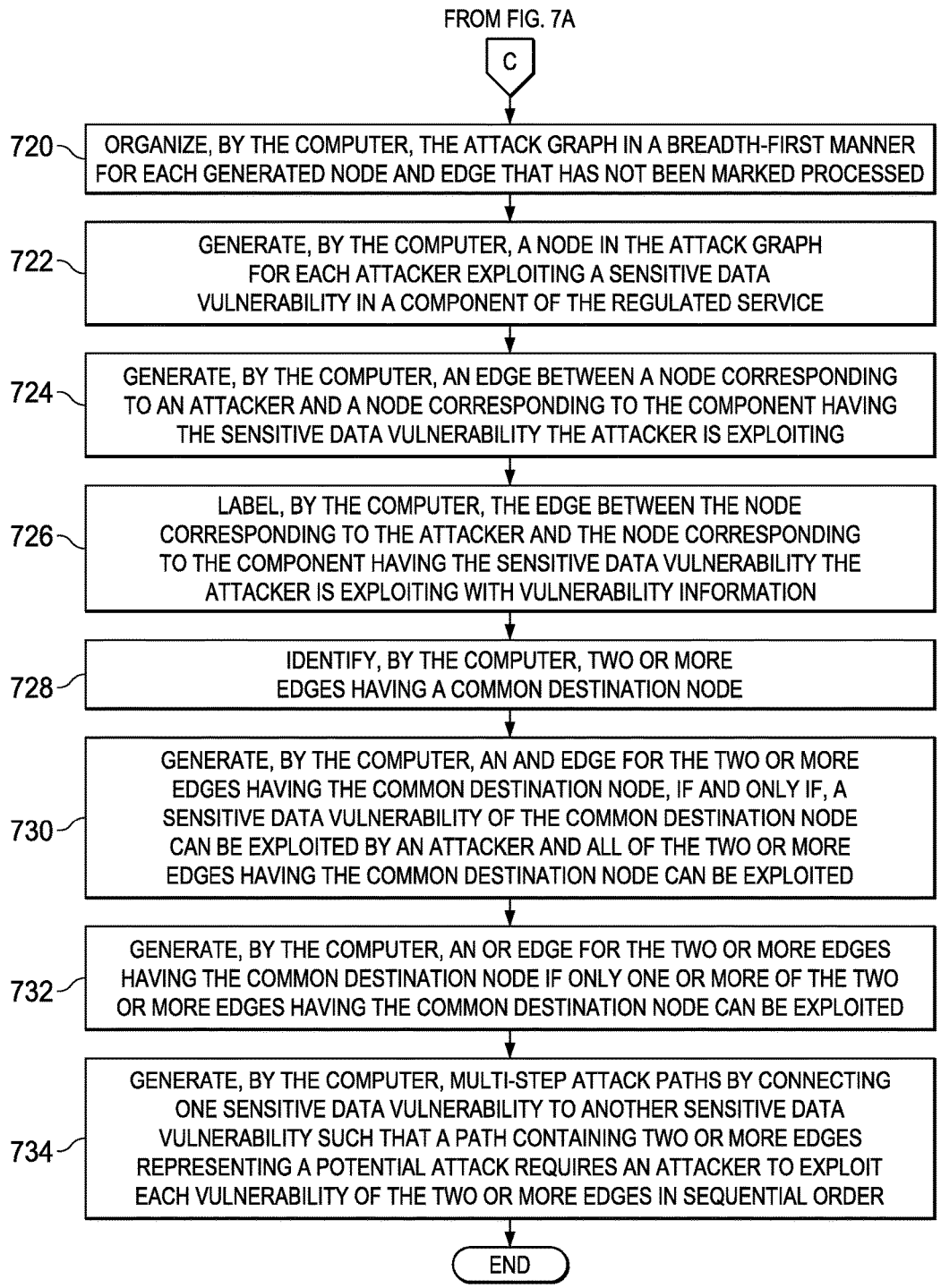

With reference now to FIGS. 7A-7B, a flowchart illustrating a process for generating an attack graph is shown in accordance with an alternative illustrative embodiment. The process shown in FIGS. 7A-7B may be implemented in a computer, such as, for example, server 104 FIG. 1 and data processing system 200 in FIG. 2.

The process begins when the computer generates a node in the attack graph for each component of a regulated service that carries out an operation on sensitive data and has a sensitive data vulnerability associated with it (step 702). The computer also generates an edge between nodes of related components in the attack graph (step 704). In addition, the computer labels edges between the nodes of the related components (step 706).

Further, the computer generates a node in the attack graph for each user that communicates with a component of the regulated service that carries out an operation on sensitive data and has a sensitive data vulnerability associated with it (step 708). Furthermore, the computer generates an edge between a node corresponding to a user and a node corresponding to the component the user communicates with (step 710). Moreover, the computer generates a node in the attack graph for each external data processing system that communicates with a component of the regulated service that carries out an operation on sensitive data and has a sensitive data vulnerability associated with it (step 712). The computer also generates an edge between a node corresponding to an external data processing system and a node corresponding to the component the external data processing system communicates with (step 714).

In addition, the computer generates a node in the attack graph for each network that communicates with a component of the regulated service that carries out an operation on sensitive data and has a sensitive data vulnerability associated with it (step 716). Further, the computer generates an edge between a node corresponding to a network and a node corresponding to the component the network communicates with (step 718). Furthermore, the computer organizes the attack graph in a breadth-first manner for each generated node and edge that has not been marked processed (step 720).

Moreover, the computer generates a node in the attack graph for each attacker exploiting a sensitive data vulnerability in a component of the regulated service (step 722). The computer also generates an edge between a node corresponding to an attacker and a node corresponding to the component having the sensitive data vulnerability the attacker is exploiting (step 724). In addition, the computer labels the edge between the node corresponding to the attacker and the node corresponding to the component having the sensitive data vulnerability the attacker is exploiting with vulnerability information (step 726).

Further, the computer identifies two or more edges having a common destination node (step 728). Furthermore, the computer generates an AND edge for the two or more edges having the common destination node, if and only if, a sensitive data vulnerability of the common destination node can be exploited by an attacker and all of the two or more edges having the common destination node can be exploited (step 730). Moreover, the computer generates an OR edge for the two or more edges having the common destination node if only one or more of the two or more edges having the common destination node can be exploited (step 732). The computer also generates multi-step attack paths by connecting one sensitive data vulnerability to another sensitive data vulnerability such that a path containing two or more edges representing a potential attack requires an attacker to exploit each vulnerability of the two or more edges in sequential order (step 734). Thereafter, the process terminates.

Figure 8:
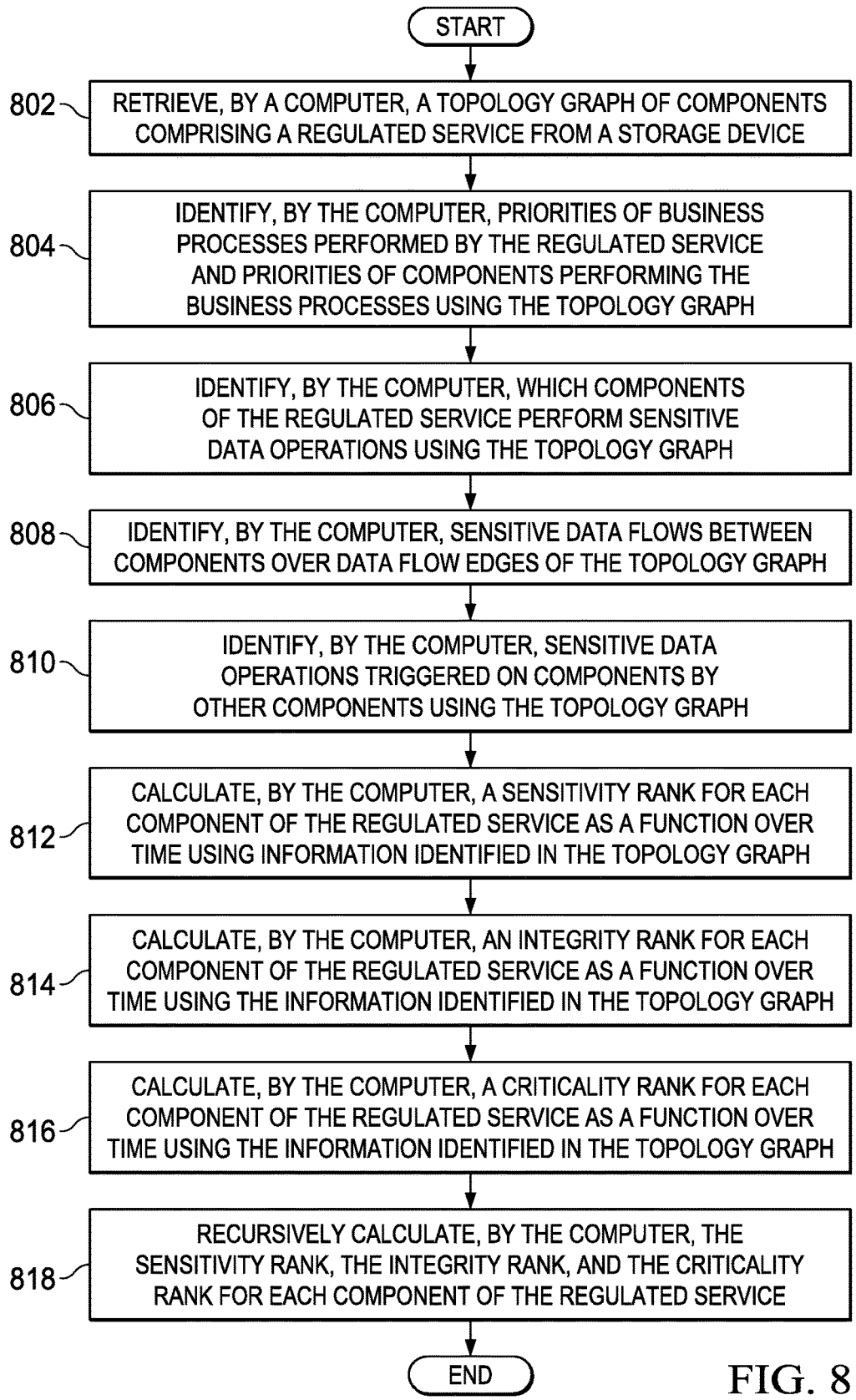
FIG. 8 is a flowchart illustrating a process for calculating sensitivity, integrity, and criticality ranks for components corresponding to nodes in an attack graph in accordance with an alternative illustrative embodiment.

With reference now to FIG. 8, a flowchart illustrating a process for calculating sensitivity, integrity, and criticality ranks for components corresponding to nodes in an attack graph is shown in accordance with an alternative illustrative embodiment. The process shown in FIG. 8 may be implemented in a computer, such as, for example, server 104 FIG. 1 and data processing system 200 in FIG. 2.

The process begins when the computer retrieves a topology graph of components comprising a regulated service from a storage device (step 802). Afterward, the computer identifies priorities of business processes performed by the regulated service and priorities of components performing the business processes using the topology graph (step 804). The computer also identifies which components of the regulated service perform sensitive data operations using the topology graph (step 806).

In addition, the computer identifies sensitive data flows between components over data flow edges of the topology graph (step 808). Further, the computer identifies sensitive data operations triggered on components by other components using the topology graph (step 810). Then, the computer calculates a sensitivity rank for each component of the regulated service as a function over time using information identified in the topology graph (step 812).

Furthermore, the computer calculates an integrity rank for each component of the regulated service as a function over time using information identified in the topology graph (step 814). Moreover, the computer calculates a criticality rank for each component of the regulated service as a function over time using information identified in the topology graph (step 816). The computer also recursively calculates the sensitivity rank, the integrity rank, and the criticality rank for each component of the regulated service (step 818). Thereafter, the process terminates.

Figure 9:
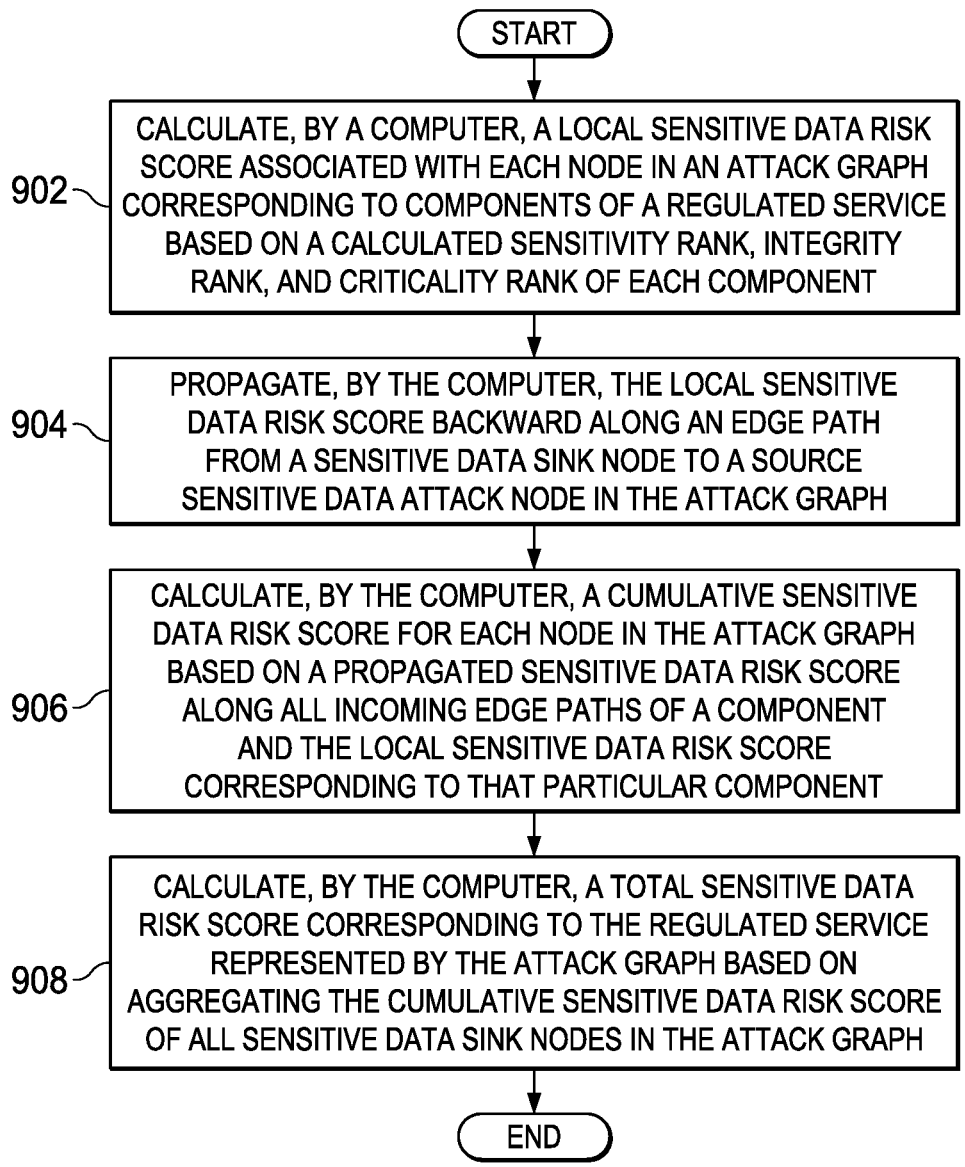
FIG. 9 is a flowchart illustrating a process for propagating risk in an attack graph in accordance with an alternative illustrative embodiment.

With reference now to FIG. 9, a flowchart illustrating a process for propagating risk in an attack graph is shown in accordance with an alternative illustrative embodiment. The process shown in FIG. 9 may be implemented in a computer, such as, for example, server 104 FIG. 1 and data processing system 200 in FIG. 2.

The process begins when the computer calculates a local sensitive data risk associated with each node in an attack graph corresponding to components of a regulated service based on a calculated sensitivity rank, integrity rank, and criticality rank of each component (step 902). Afterward, the computer propagates the local sensitive data risk backward along an edge path from a sensitive data sink node to a source sensitive data attack node in the attack graph (step 904). Then, the computer calculates a cumulative sensitive data risk for each node in the attack graph based on a propagated sensitive data risk along all incoming edge paths of a component and the local sensitive data risk corresponding to that particular component (step 906). Subsequently, the computer calculates a total sensitive data risk corresponding to the regulated service represented by the attack graph based on aggregating the cumulative sensitive data risk of all sensitive data sink nodes (step 908). Thereafter, the process terminates.

Thus, illustrative embodiments of the present invention provide a computer-implemented method, computer system, and computer program product for calculating a risk to a set of sensitive data corresponding to a regulated service provided by a set of components comprising the regulated service based on automatically generating a data-centric attack graph of nodes representing the set of components and propagating risk scores to related components along edge paths in the attack graph connecting related components. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating an attack graph to protect sensitive data objects located on a network from attack, the computer-implemented method comprising:

generating, by a computer, the attack graph that includes nodes representing components in a set of components of a regulated service and edges between nodes representing relationships between related components in the set of components based on vulnerability and risk metrics corresponding to each component in the set of components;

calculating, by the computer, a risk score for each component represented by a node in the attack graph based on a sensitivity rank and a criticality rank corresponding to each respective component;

aggregating, by the computer, risk scores for each component along each edge path connecting a node of a particular component to a node of a related component to form an aggregated risk score for each component; and responsive to the computer determining that the aggregated risk score of a component is greater than or equal to a risk threshold, performing, by the computer, an action to mitigate a risk to sensitive data corresponding to the component posed by an attack via the network.

2. The computer-implemented method of claim 1 further comprising:

calculating, by the computer, a level of compromisability of sensitive data for each component represented by a node in the attack graph based on the vulnerability and risk metrics corresponding to each respective component and edge paths between nodes of related components;

calculating, by the computer, the sensitivity rank, an integrity rank, and the criticality rank for each component represented by a node in the attack graph using a topology graph of the regulated service; and calculating, by the computer, the risk score for each component represented by a node in the attack graph based on the level of compromisability, the sensitivity rank, the integrity rank, and the criticality rank corresponding to each respective component.

3. The computer-implemented method of claim 2, wherein the computer calculates the level of compromisability of the sensitive data using a network flow algorithm, and wherein the network flow algorithm is a max-flow min-cut algorithm.

4. The computer-implemented method of claim 2 further comprising:

normalizing, by the computer, the aggregated risk score for each component in the set of components of the regulated service to form a normalized risk score for each component.

5. The computer-implemented method of claim 4 further comprising:

comparing, by the computer, the normalized risk score for each component with a risk threshold value; and responsive to the computer determining that the normalized risk score of a component is greater than or equal to the risk threshold value, performing, by the computer, the action based on the normalized risk score being greater than the risk threshold value.

6. The computer-implemented method of claim 1 further comprising:

identifying, by the computer, a set of sensitive data corresponding to the regulated service;

scanning, by the computer, for the set of components corresponding to the regulated service that are authorized to perform activities associated with sensitive data;

identifying, by the computer, the vulnerability and risk metrics corresponding to each component in the set of components of the regulated service; and generating, by the computer, a topology graph of the regulated service based on each identified component in the set of components and a configuration of each identified component.

7. The computer-implemented method of claim 6 further comprising:

identifying, by the computer, authorized activities associated with the set of sensitive data.

8. The computer-implemented method of claim 1 further comprising:

identifying, by the computer, two or more edges having a common destination node in the attack graph.

9. The computer-implemented method of claim 8, wherein the attack graph is an AND/OR graph.

10. The computer-implemented method of claim 9 further comprising:

generating, by the computer, an AND edge for the two or more edges having the common destination node, if and only if, a sensitive data vulnerability of the common destination node can be exploited by an attacker and all of the two or more edges having the common destination node are exploited.

11. The computer-implemented method of claim 9 further comprising:

generating, by the computer, an OR edge for the two or more edges having the common destination node if only one or more of the two or more edges having the common destination node can be exploited.

12. The computer-implemented method of claim 9 further comprising:

generating, by the computer, multi-step attack paths by connecting one sensitive data vulnerability to another sensitive data vulnerability such that a path containing two or more edges representing an attack requires an attacker to exploit each vulnerability of the two or more edges in sequential order.

13. The computer-implemented method of claim 1 further comprising:

propagating, by the computer, a local sensitive data risk backward along an edge path from a sensitive data sink node to a source sensitive data attack node in the attack graph.

14. The computer-implemented method of claim 13 further comprising:

calculating, by the computer, a cumulative sensitive data risk for each node in the attack graph based on a propagated sensitive data risk along all incoming edge paths of a node and the local sensitive data risk corresponding to that particular node.

15. The computer-implemented method of claim 14 further comprising:

calculating, by the computer, a total sensitive data risk corresponding to the regulated service represented by the attack graph based on aggregating cumulative sensitive data risk of all sensitive data sink nodes.

16. The computer-implemented method of claim 1, wherein the computer identifies the vulnerability and risk metrics of a component based on at least one of Common Vulnerabilities and Exposures identifiers, application scanning, penetration testing, and vulnerability scanning.

17. A computer system for generating an attack graph to protect sensitive data objects located on a network from attack, the computer system comprising:

a bus system;

a storage device connected to the bus system, wherein the storage device stores program instructions; and a processor connected to the bus system, wherein the processor executes the program instructions to:

generate the attack graph that includes nodes representing components in a set of components of a regulated service and edges between nodes representing relationships between related components in the set of components based on vulnerability and risk metrics corresponding to each component in the set of components;

calculate a risk score for each component represented by a node in the attack graph based on a sensitivity rank and a criticality rank corresponding to each respective component;

aggregate risk scores for each component along each edge path connecting a node of a particular component to a node of a related component to form an aggregated risk score for each component; and perform an action to mitigate a risk to sensitive data corresponding to a component posed by an attack via the network in response to determining that the aggregated risk score of the component is greater than or equal to a risk threshold.

18. A computer program product for generating an attack graph to protect sensitive data objects located on a network from attack, the computer program product comprising a computer readable storage medium having program instructions embodied therewith, the program instructions executable by a computer to cause the computer to perform a method comprising:

generating, by the computer, the attack graph that includes nodes representing components in a set of components of a regulated service and edges between nodes representing relationships between related components in the set of components based on vulnerability and risk metrics corresponding to each component in the set of components;

calculating, by the computer, a risk score for each component represented by a node in the attack graph based on a sensitivity rank and a criticality rank corresponding to each respective component;

aggregating, by the computer, risk scores for each component along each edge path connecting a node of a particular component to a node of a related component to form an aggregated risk score for each component; and responsive to the computer determining that the aggregated risk score of a component is greater than or equal to a risk threshold, performing, by the computer, an action to mitigate a risk to sensitive data corresponding to the component posed by an attack via the network.

19. The computer program product of claim 18 further comprising:

calculating, by the computer, a level of compromisability of sensitive data for each component represented by a node in the attack graph based on the vulnerability and risk metrics corresponding to each respective component and edge paths between nodes of related components;

calculating, by the computer, the sensitivity rank, an integrity rank, and the criticality rank for each component represented by a node in the attack graph using a topology graph of the regulated service; and calculating, by the computer, the risk score for each component represented by a node in the attack graph based on the level of compromisability, the sensitivity rank, the integrity rank, and the criticality rank corresponding to each respective component.

20. The computer program product of claim 19, wherein the computer calculates the level of compromisability of the sensitive data using a network flow algorithm, and wherein the network flow algorithm is a max-flow min-cut algorithm.

* * * * *